Dec. 9, 1958 A. F. STAMM 2,863,695
TRACTOR-TRAILER AIRSTREAM CONTROL KIT
Filed Nov. 19, 1954 2 Sheets-Sheet 1
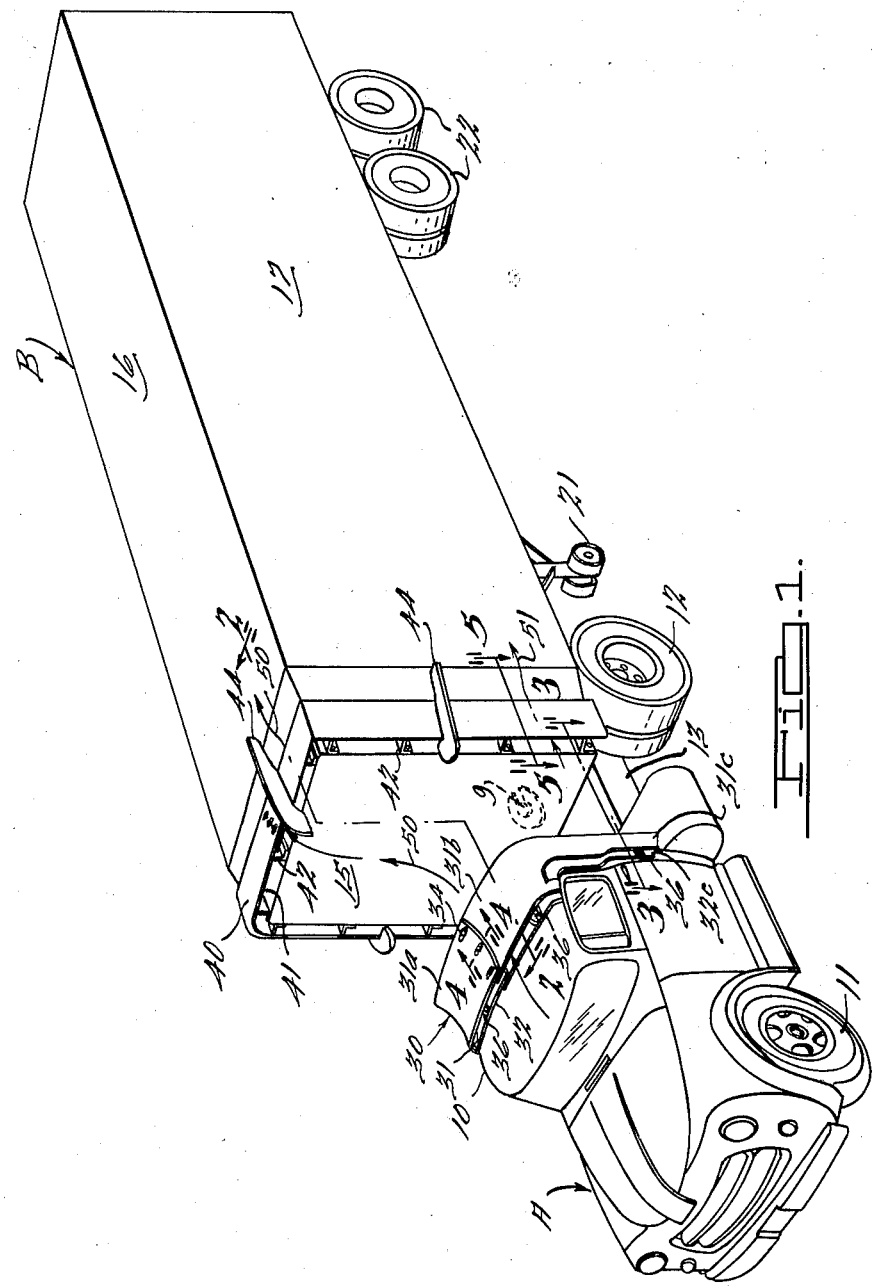
INVENTOR.
Alexander F. Stamm
BY
Harness and Harris
ATTORNEYS.

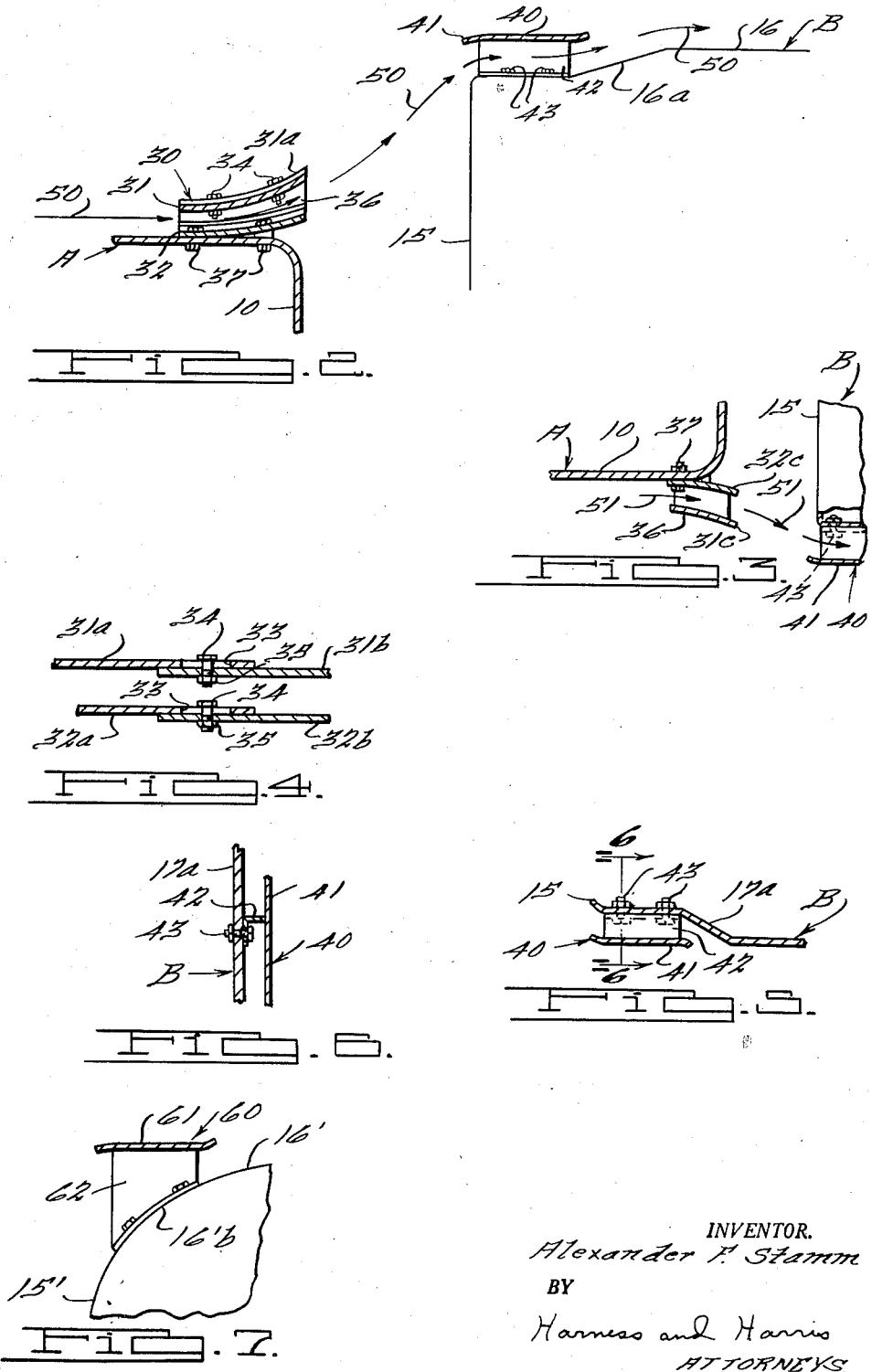

United States Patent Office 2,863,695
Patented Dec. 9, 1958

2,863,695

TRACTOR-TRAILER AIRSTREAM CONTROL KIT

Alexander F. Stamm, Rochester, Mich., assignor to Chrysler Corporation, Highland Park, Mich., a corporation of Delaware Application November 19, 1954, Serial No. 469,913

2 Claims. (Cl. 296—1)

As a result of a series of comprehensive wind tunnel tests recently conducted on scale models of present day tractor-trailer combinations, and various modifications thereof, a number of revealing conclusions as to tractor-trailer air flow drag losses and their relation to tractor-trailer design have become obvious.

The more important conclusions resulting from the aforementioned tests are:

(1) A significant reduction in horsepower drag losses in tractor-trailer combinations can be achieved by controlling the air flow between the rear of the tractor cab and the front end of the attached trailer body.

(2) Rounding or beveling the top and side edges of the front end of the trailer body produces a significant reduction in tractor-trailer drag losses.

(3) Tractor-trailer drag losses seem to increase with increase in the space between the tractor cab and the front end of the trailer body, at least up to a certain limit.

(4) The use of skirting beneath the tractor front end and along the lower portions of the trailer body sides also reduces tractor trailer drag losses.

(5) Rounding or beveling of the side and top edges of the rear wall of the trailer body has little effect on reducing tractor-trailer drag losses.

(6) The use of streamlining at the rear end of the trailer body, such as by use of a tapering tail section on the trailer body, does not reduce drag losses sufficiently to justify the accompanying reduction in trailer load carrying capacity.

(7) The use of deflecting vanes at the rear end of the trailer body does not produce any significant reduction in tractor-trailer drag losses.

(8) Removal of the tractor under-body-mounted spare tire and its carrier gear, the tractor gas tanks, and projecting frame cross members on the undercarriage of the trailer, does not produce any significant reductions in tractor-trailer drag losses.

The aforementioned wind tunnel tests very definitely established that when streamlining was applied to the region between the rear of the tractor cab and the front end of the trailer body, so as to control the air flow rearwardly from the cab and prevent turbulence in this region, that then a significant reduction in drag losses should result. While it would be most efficient to have a smooth surfaced sheeting extend rearwardly from the periphery of the tractor cab to the peripheral edges of the front wall of the trailer body, so as to completely enclose the space between the tractor cab and the attached trailer body, still, such an arrangement would not be feasible due to the fact that the tractor cab and the trailer body must be free to rotate relative to each other through approximately 180 degrees. Accordingly, it is a primary object of this invention to provide a practical device that may be readily applied to any conventional tractor-trailer combination to control the air flow between the tractor cab and the front end of the trailer so as to significantly reduce the drag losses that normally result from the air flow turbulence in this region.

It is another object of this invention to provide an accessory kit that may be readily applied to the rear portion of a conventional tractor cab and to the front end of the tractor attached trailer body so as to control air flow between the tractor cab and attached trailer body.

It is still another object of this invention to provide an air flow control attachment for the rear portions of tractor cabs that is adapted to guide the air flow rearwardly towards and across the rearwardly located tractor attached trailer body and thereby reduce the drag losses of such a combination of attached vehicles.

It is still another object of this invention to provide an air flow control attachment for the edge portions of the front wall of a tractor drawn trailer body that is adapted to reduce the turbulence that normally exists at the front end of the trailer that is drawn by a conventional tractor.

Other objects and advantages of this invention will become readily apparent from a reading of the following description and a consideration of the related drawings wherein:

Fig. 1 is a perspective view of a tractor drawn trailer equipped with the air flow control device embodying this invention;

Fig. 2 is an enlarged, fragmentary, sectional elevational view taken along the line 2—2 of Fig. 1;

Fig. 3 is an enlarged, fragmentary, sectional elevational view taken along the line 3—3 of Fig. 1;

Fig. 4 is an enlarged, fragmentary, sectional elevational view taken along the line 4—4 of Fig. 1;

Fig. 5 is an enlarged, fragmentary, sectional elevational view taken along the line 5—5 of Fig. 1;

Fig. 6 is an enlarged, fragmentary, sectional elevational view taken along the line 6—6 of Fig. 5; and Fig. 7 is a fragmentary sectional elevational view of a modified form of front end construction for the trailer body.

In the drawings A represents the motor driven towing tractor vehicle and B represents the towed trailer vehicle that is attached to the tractor A by conventional king pin bearing means 9 that are shown schematically. The tractor A has cab 10 that is of conventional size, location and shape. The tractor cab 10 is usually only about one-half as high as the top of the body of the trailer B and is spaced forwardly of the front wall of the rearwardly positioned trailer B. Wheels 11 and 12 support the chassis frame 13 of the tractor A.

The body of trailer B is essentially an elongated box that includes a front wall 15, a top wall 16, and opposed side walls 17. Trailer B includes conventional landing gear 21 and rear wheels 22.

As has been previously pointed out, considerable drag loss can be eliminated by reducing the air flow turbulence that normally occurs between the rear of the tractor cab 10 and the front end of the towed trailer B. This invention discloses a simplified, readily applied, accessory kit that can be installed on the tractor cab and on the adjacent front end portion of the tractor towed trailer body to materially reduce the drag losses of such a combination of vehicles. It is the prime purpose of this accessory kit to provide a means for readily controlling the air flow from the cab rearwardly across the space between the back end of the tractor cab 10 and the front end 15 of the rearwardly located trailer B. By controlling the air flow across the space between the tractor cab and the trailer body it is possible to direct the manner of air flow across the surfaces of the trailer and thereby keep turbulence to a minimum.

The air flow accessory kit embodying this invention comprises a cab mounted portion 30 and a trailer mounted portion 40. The cab mounted portion 30, see Figs. 1 and 2 particularly, includes a pair of spaced apart shells 31 and 32 that are of a substantially inverted U-shaped cross sectional configuration. The bight portions of the U-shaped shells 31, 32 are adapted to extend across and be suported on the roof of the tractor cab 10 whereas the leg portions of the U-shaped shells 31 and 32 are adapted to extend downwardly along and to be connected to the side walls of the tractor cab 10 adjacent the rear end of the cab 10. Each of the U-shaped shells or shrouds 31 and 32 may be made in two sections which sections are each of substantially L-shaped cross-sectional configuration. The base leg portions 31a, 32a and 31b, 32b (see Fig. 4), that overlie the roof of the tractor cab 10 are arranged in overlapping relationship and each of the legs 31a and 32a has one or more slots 33 that are adapted to receive the bolts 34. Bolts 34 threadably receive the nuts 35 so that the shells or shrouds 31 and 32 may be adjusted in width to fit tractor cabs of different sizes. The shell or shroud elements 31 and 32 have their leg portions 31c and 32c respectively mounted on and extending downwardly adjacent to the sides of the cab 10 at the rear end portion thereof (see Figs. 1 and 3). Stiffener plates 36 extend between the spaced apart shells or shrouds 31 and 32 to maintain these elements in spaced apart relationship. Bolt type connectors, such as the elements 37, may be used to fixedly mount the shell elements 31 and 32 on the tractor cab 10. Obviously any equivalent screw, clamp or tack welding means could be substituted for the bolt connectors 37 herein disclosed.

It will be noted from Figs. 2 and 3 that the spaced apart shells 31 and 32 are shaped so as to diverge towards the rear of the cab 10. Also, the portions of the shells 31, 32, that overlie the top of the tractor cab 10, are tilted upwardly in addition to diverging so that the airstream flowing rearwardly through the conduit means formed by the spaced shell portions 31a, 31b and 32a, 32b will be discharged upwardly towards the upper edge of the front wall 15 of the trailer body. The arrows 50, see Fig. 2, show the airstream control effect that results from passing the airstream discharged from the rear of the tractor cab roof through the spaced shell conduit means 31, 32. It will be noted that the airstream discharged from the shells 31, 32 is directed, as shown by arrows 50, upwardly and rearwardly so that it will pass into the conduit 40 that is located around the periphery of the front wall 15 of the body of the trailer B. This controlled air flow from the rear portion of the tractor cab 10 prevents or substantially eliminates, the air flow turbulence that otherwise results at the front end of the trailer body and as a result drag losses are materially reduced.

The same type of controlled airstream flow occurs along the sides of the tractor cab 10 as occurs across the top of the tractor cab. From Fig. 3 it will be noted that the leg portions 31c, 32c of the spaced apart shell elements 31, 32 provide a conduit means for collecting and controlling the discharge of the airstream from along the sides of the tractor cab 10. The leg 32c of shell 32 is fixed to the cab body 10 by the bolt connectors 37 and spacer plates 36 space the shell legs 31c, 32c. The shell legs 31c, 32c diverge rearwardly and are also tilted outwardly from the body of the tractor cab 10 to cause the airstream flow, as indicated by the arrows 51, to pass outwardly from the tractor cab 10 towards the conduit 40 that extends around the front wall 15 of the trailer body. This controlled airstream flow along the sides of the truck cab and the trailer prevents turbulence at the front end of the trailer and reduces drag losses.

The conduit 40 that is fixed to the front end of the trailer body comprises a shell or shroud 41 element of substantially inverted U-shaped cross sectional configuration. This shell element 41 may be composed of two substantially L-shaped sections that are bolted together by bolt and slot connector means similar to the aforedescribed means 33—35. The making of the shroud 41 in adjustably connected sections permits it to be fitted to varying size trailers. The conduit 40 is designed to fit about the edges of the front end of the trailer body in spaced relation thereto so as to provide an airstream conduit to control the discharge of the airstream along the outer surfaces of the trailer body. Shell 41 is held in outwardly spaced relation to the front end of the trailer body by the spacer plates 42. The spacer plates 42 may be fixedly connected to the trailer body and nut connectors 43 or by any equivalent type of connection.

From Figs. 2 and 5 it will be noted that the front end of the trailer is preferably formed with a recessed step-like formation 16a, 17a that is intended to receive the conduit shell 40. By providing a recess to receive the conduit member 40, the trailer roof can be extended upwardly to the prescribed overhead limits and thus valuable trailer load carrying capacity is not sacrificed. Obviously the conduit member 40 could be mounted on top of a perfectly flat trailer roof if the overhead projection of the conduit member 40 did not present economic or regulatory problems. As indicated by the arrows 50 and 51 in Figs. 2 and 3, the cab conduit or shell member 30 will cause airstream flow along the top and sides of the cab to be directed rearwardly in such a fashion that it will be directed into the trailer mounted conduit shell member 40 and thereafter discharged along the top and sides of the trailer body in a fashion that tends to reduce airstream turbulence and thereby reduce drag losses. The trailer mounted conduit member 40 may also include a number of guide vanes 44 that project into the airstream and assist in controlling its path of flow.

Fig. 7 shows a modified form of trailer mounted, shell-type, airstream gathering and discharge conduit 60. The conduit 60 is adapted to be mounted on the front end of a trailer body 16' that has the edges of its front wall rounded or curved rather than formed with recessed step formations such as 16a, 17a of the form of the invention shown in Figs. 1–6. The shell member 61 of the Fig. 7 form of the invention is substantially identical to the member 41 shown in Figs. 1–6. However, the spacer support plates 62 for the shell plate 61 in the Fig. 7 form are formed to fit the curvature of the trailer body at its front end. These spacer plates 62 could be made as shown or as adjustable devices to fit different types of body curvatures. In all other respects the shell type conduit 60 of Fig. 7 is similar in structure and function to the shell conduit 40 of the Fig. 1–6 form of this invention.

While this invention shows the airstream control kit for the tractor-trailer combination made in the form of an accessory item that can be added to existing tractors and/or trailers, still, it is within the scope of this invention to form the tractor and/or trailer airflow conduit elements as integral parts of the tractor cab and trailer body if so desired. It is also possible, and within the scope of this invention, to use merely one or the other of the two airflow control conduits under certain circumstances. Also it is a part of this invention to include in combination with the trailer mounted airflow conduit elements, the step-like (Fig. 1) or rounded (Fig. 7) peripheral edge portions of the front wall of the trailer body for these trailer body formations materially assist in controlling the flow through the trailer mounted conduit and thereby reducing turbulence and attendant drag losses.

I claim:

1. In a tractor-trailer combination vehicle having the tractor cab spaced forwardly of the trailer body, a first open-ended, conduit type, airflow control means mounted on the rearwardly located top and side peripheral surface portions of the tractor cab to receive and guidingly discharge the airstream passing rearwardly over the tractor body during forward motion thereof, said first airflow control means being arranged to discharge the said airstream towards top and side peripheral portions of the front end of the rearwardly positioned trailer, said top and side peripheral portions of the trailer front end being depressed to provide airflow guiding formations, and a second open-ended, conduit, type, airflow control means mounted on the depressed peripheral surface portions of the front end of the trailer to receive the airstream discharged by the tractor mounted airflow control means and to guidingly discharge said airstream rearwardly along the peripheral surface portions of the trailer, said airflow means each comprising an inverted U-shaped, frame member composed of a plurality of adjustably interconnected frame elements.

2. In a tractor-trailer combination vehicle having the tractor cab spaced forwardly of the trailer body, a first open-ended, conduit type, airflow control means mounted on the rearwardly located top and side peripheral surface portions of the tractor cab to receive and guidingly discharge the airstream passing rearwardly over the tractor body during forward motion thereof, said first airflow control means being arranged to discharge the said airstream towards the top and side peripheral portions of the front end of the rearwardly positioned trailer, the top and side peripheral portions of the front end of said trailer having a depressed step formation therein, and a second open-ended, conduit type, airflow control means mounted in the depressed step formation formed around the peripheral surface portions of the front end of the trailer to receive the airstream discharged by the tractor mounted airflow control means and to guidingly discharge said airstream rearwardly along the peripheral surface portions of the trailer.

References Cited in the file of this patent

UNITED STATES PATENTS

| 2,243,906 | Huet | June 3, 1941 |
| 2,334,856 | Atkinson | Nov. 23, 1943 |
| 2,514,695 | Dempsey | July 11, 1950 |

FOREIGN PATENTS

| 772,240 | France | Aug. 13, 1934 |
| 15,212 of 1913 | Great Britain | May 21, 1914 |
| 471,342 | Great Britain | Sept. 2, 1937 |